US010308071B2

(12) United States Patent
Inoue et al.

(10) Patent No.: US 10,308,071 B2
(45) Date of Patent: Jun. 4, 2019

(54) REINFORCEMENT STRUCTURE FOR RUBBER ARTICLES AND METHODS OF PREPARATION

(75) Inventors: Akane Inoue, Tokyo (JP); W Stephen Fulton, Goostrey (GB); Kazuhiro Doshita, Tokyo (JP)

(73) Assignees: NGF EUROPE LTD, St Helens (GB); NIPPON SHEET GLASS COMPANY, LIMITED, Tokyo (JP)

( * ) Notice: Subject to any disclaimer, the term of this patent is extended or adjusted under 35 U.S.C. 154(b) by 612 days.

(21) Appl. No.: 13/392,045

(22) PCT Filed: Aug. 20, 2010

(86) PCT No.: PCT/GB2010/001575
§ 371 (c)(1),
(2), (4) Date: May 3, 2012

(87) PCT Pub. No.: WO2011/023936
PCT Pub. Date: Mar. 3, 2011

(65) Prior Publication Data
US 2012/0225318 A1 Sep. 6, 2012

(30) Foreign Application Priority Data
Aug. 25, 2009 (GB) .................................. 0914854.5

(51) Int. Cl.
*B60C 9/00* (2006.01)
*D07B 1/06* (2006.01)
*B60C 1/00* (2006.01)
*C23C 18/12* (2006.01)

(52) U.S. Cl.
CPC .............. *B60C 1/00* (2013.01); *D07B 1/0666* (2013.01); *B60C 2009/0021* (2013.01); *C23C 18/122* (2013.01); *C23C 18/125* (2013.01); *C23C 18/1225* (2013.01); *C23C 18/1254* (2013.01); *D07B 2201/2011* (2013.01); *D07B 2201/2012* (2013.01); *D07B 2201/2013* (2013.01); *D07B 2205/3017* (2013.01); *D07B 2205/3089* (2013.01); *Y10T 428/12597* (2015.01); *Y10T 428/249969* (2015.04); *Y10T 428/265* (2015.01); *Y10T 428/296* (2015.01); *Y10T 428/2938* (2015.01); *Y10T 428/31663* (2015.04)

(58) Field of Classification Search
CPC .............. D07B 1/0666; D07B 2801/18; D07B 2205/3003; C23C 18/122; C23C 18/1225; C23C 18/125; C23C 18/1254
See application file for complete search history.

(56) References Cited

U.S. PATENT DOCUMENTS

| | | | | |
|---|---|---|---|---|
| 3,864,203 A * | 2/1975 | Marzocchi | ................... | 523/203 |
| 3,913,652 A | 10/1975 | Imamura et al. | | |
| 4,880,650 A * | 11/1989 | Okamura | ............. | C12H 1/0408 426/330.4 |
| 5,139,601 A * | 8/1992 | Holmes-Farley | ......... | B32B 7/12 106/287.16 |
| 5,139,820 A * | 8/1992 | Sawada et al. | ................ | 427/120 |
| 5,182,143 A * | 1/1993 | Holmes-Farley | ...... | C03C 17/009 427/409 |
| 5,222,092 A * | 6/1993 | Hench | ...................... | H01S 3/168 372/53 |
| 5,750,197 A * | 5/1998 | van Ooij | ................... | B05D 7/16 106/14.15 |
| 6,059,951 A | 5/2000 | Orjela | | |
| 6,465,108 B1 | 10/2002 | Kamitani et al. | | |
| 6,605,365 B1 * | 8/2003 | Krienke | ................. | B05D 3/102 428/328 |
| 6,830,826 B2 * | 12/2004 | Brabant | ..................... | C08J 5/06 428/364 |
| 7,066,228 B2 * | 6/2006 | Grimberg | .................. | B60C 1/00 152/151 |
| 8,476,528 B2 * | 7/2013 | Hodgson et al. | ......... | 174/110 R |
| 2003/0216489 A1 | 11/2003 | Wang et al. | | |
| 2004/0037964 A1* | 2/2004 | Davies et al. | .............. | 427/397.8 |
| 2004/0122180 A1* | 6/2004 | Hergenrother | ........... | C08K 5/54 525/326.1 |
| 2005/0079364 A1* | 4/2005 | van Ooij | ............... | B60C 9/0007 428/447 |
| 2008/0118745 A1 | 5/2008 | Endres et al. | | |

FOREIGN PATENT DOCUMENTS

EP     188370 A  *  7/1986
EP     1 935 932      6/2008
(Continued)

OTHER PUBLICATIONS

Estella, Effects of aging and drying conditions on the structural and textural properties of silica gels, Microporous and Mesoporous Materials, vol. 102 (2007), pp. 274-282.*

(Continued)

*Primary Examiner* — Monique R Jackson
(74) *Attorney, Agent, or Firm* — Hamre, Schumann, Mueller & Larson, P.C.

(57) ABSTRACT

A reinforcement means for molded and extruded articles such as tires has a metal structure with a layer of silica gel bonded thereto. The silica gel bonds the reinforcement means to the rubber compound during the molding/vulcanization of the rubber compound without the need for a slow curing stage. The silica gel may be applied to the metal structure by a sol-gel process with the gel formed by drying the sol at a temperature up to 150° C. The reinforcement means is preferably a cable formed from steel wires coated with the silica gel. To further improve bonding of the silica gel to the rubber compound, an organosilane bonding agent may be included in the rubber compound or the reinforcing means provided with a second layer comprising an organosilane as a bonding agent. The reinforcement means are particularly useful for strengthening and providing geometric stability to tires.

33 Claims, No Drawings

(56) References Cited

FOREIGN PATENT DOCUMENTS

| JP | 56-021827 | 2/1981 |
| JP | 5-051491 | 3/1993 |
| JP | 2007-511622 | 5/2007 |
| WO | 02/22745 | 3/2002 |
| WO | 03/022940 | 3/2003 |
| WO | 2005/035634 | 4/2005 |
| WO | 2008/128932 | 10/2008 |

OTHER PUBLICATIONS

Rajeshkumar, Role of Drying Techniques on the Development of Porosity in Silica Gels, Journal of Porous Materials, vol. 5, (1998), pp. 59-63.*
Curran, Morphology and pore structure of silica xerogels made at low pH, Journal of Non-Crystalline Solids, vol. 249 (1999), pp. 62-68.*
Silicon dioxide, From Wikipedia, the free encyclopedia, downloaded Jan. 4, 2018 from https://en.wikipedia.org/wiki/Silicon_dioxide.*
Surface roughness, From Wikipedia, the free encyclopedia, downloaded Jan. 5, 2018 from https://en.wikipedia.org/wiki/Surface_roughness.*
Fulton, et al., "Steel Tire Cord-Rubber Adhesion, Including the Contribution of Cobalt", Rubber Chemistry and Technology, vol. 78, pp. 426-457, 2004.

* cited by examiner

REINFORCEMENT STRUCTURE FOR RUBBER ARTICLES AND METHODS OF PREPARATION

INTRODUCTION

The present invention relates to reinforcement structures, such as wires or cables, for rubber articles such as tires. In particular it relates to reinforcement structures that may be strongly bonded to a rubber matrix with a reduced curing or vulcanization cycle,

BACKGROUND

Within the moulded and extruded rubber goods industry, certain applications benefit from the inclusion of reinforcement, typically in the form of fibres, wires, cables, textiles, or woven structures within the rubber matrix of the moulded or extruded rubber article. This permits good dimensional control of the moulded rubber goods so that anisotropic behaviour can be designed into the product to enhance performance in the field. One such example is in the production of rubber tires where the introduction of metal cord, usually steel cord, into the rubber matrix of the tire to provide structural strength and geometric stability.

In order for a reinforcement means to function well, it should have adequate performance in respect of temperature resistance (to allow processing), high elastic modulus (to resist excessive rubber stretch) and excellent adhesion to the matrix rubber (so that the final reinforced rubber article can behave as a true composite).

The following abbreviations are used throughout the description: EPDM—rubber prepared from ethylene-propylene-diene monomer; BIIR—brominated isobutene isoprene rubber, CR—chloroprene rubber, CSM—chlorosulphonated polyethylene rubber, HNBR—hydrogenated acrylonitrile-butadiene rubber, NBR—acrylonitrile-butadiene rubber, SBR—styrene butadiene rubber, NR—natural rubber and BR-butadiene rubber.

Brass-coated steel cords are presently used as the principal strengthening elements in regions of pneumatic tires such as the belt, carcass and bead. Since the development by Michelin in 1946 of the radial tire, brass-coated steel cord has become a common form of reinforcement and is used in around 98% of the world's passenger tires and 70%-80% of truck tires. Brass-coated steel cords allow the tyre manufacturer to optimize many physical parameters of the tyre, such as strength, stiffness, modulus, stability, and uniformity. Indeed, high stiffness of the belt region is essential for good tread wear, handling and low rolling resistance characteristics of the tyre.

The bond formed between brass-coated steel cord reinforcement structures and the rubber compound of a tire during vulcanization is an essential characteristic governing the performance and durability of car and truck tires. Brass-plating of the steel is a well-known method by which improved bonding can be achieved between rubber compounds and steel.

Bonding of rubbers as mentioned above, such as NR, to brass-plated steel cord is thought to take place as follows. During vulcanization, exposure of brass (copper and zinc alloy) to sulphur, the vulcanizing agent, creates a strong bond by the formation of non-stoichiometric copper sulphide. In the first stage, zinc sulphide forms slowly and the subsequent interstitial diffusion of copper ions through the layer is hindered because of the difference in ionic radii, with copper ions from the brass migrating more slowly than zinc ions. Zinc sulphide is capable of forming a distinct layer; nevertheless copper sulphide thickens as copper ions diffuse into this layer via lattice defects. The amount of copper sulphide present in the layer is directly related to the degree of sulphidation and it is essential to delay the cross-linking process long enough to build a copper sulphide layer of critical thickness for good adhesion. After many years of study in this field, it has still not been established exactly how the copper sulphide layer interacts with the rubber, but it is thought that because the copper sulphide layer is dendritic in form, high bond strength is achieved primarily by a tight, physical interlocking between this layer and the vulcanized rubber. Chemical cross-linking by Cu—S—NR bonds has also been proposed as part of the bonding mechanism.

Cobalt carboxylates may be used, alone or in combination with epoxy resin systems, to improve and maintain a durable bond at the rubber-brass interface. The use of such cobalt salts provides a bond between brass-coated steel and rubber that is considered as a bench-mark by which the tire industry assesses rubber-metal bond strength. U.S. Pat. No. 6,059,951 discloses a wire made of steel and coated with a zinc/cobalt alloy used for making composite elements of elastomeric material. Adhesion promoters such as cobalt neodecanoate, added to the elastomeric material, promote adhesion of the elastomeric material to the wire.

Prior art bonding systems for brass-coated steel cord, as detailed above, may limit the compositions and processes which may be used if good bond strength is to be achieved. For instance, in order to achieve good and durable adhesion between rubber and plated steel, the rubber compounds used must contain sulphur at a relatively high concentration in addition to a cobalt carboxylate as a bond-improver. Also the vulcanization rate within the rubber compound must be slow in order for the bonding layer to be formed in the so-called "scorch period" of the cure. This slow vulcanization step may give rise to a rate-limiting factor in the production process. Consequently, it is desirable to provide bonding methods which eliminate the need for such a slow curing step, so that production rates may be increased. It is also desirable to reduce the levels of undesirable and toxic materials, such as sulphur, zinc and cobalt in the rubber compound used in a tire, in order to avoid to improve safety during manufacture and to reduce toxic waste problems when tires are eventually discarded. The appropriate care has to be taken when handling cobalt carboxylates during mixing rubber compounds.

One of the methods for bonding a metal wire and rubber is to plate the surface of the metal with Cu/Zn to form a Cu—S-rubber bond in a resulting rubber composite. This method, however, has the following drawbacks because the surface of the metal wire is coated with Cu/Zn (see, for example, Stephen Fulton, et al., "Steel tire cord-rubber adhesion, including the contribution of cobalt" Rubber Chemistry and Technology (2004) Vol. 78, 426-457).

1) A $Cu_xS$ layer overgrows under some vulcanization conditions and easily peels off the surface of the wire. As a result, the adhesion to rubber decreases.

2) The adhesion to rubber decreases under conditions of high temperature, high humidity, and high concentration of salt. (The difference in ionization tendency between Cu and Zn (Zn having a greater tendency to ionize than Cu) may form a ZnS layer at the interface between metal and rubber, resulting in a decrease in the adhesion to rubber.)

Hence there is a need for reinforcement structures for rubber articles, such as tires, which can be strongly bonded to a rubber matrix of the rubber article without suffering from some or all of the problems of prior art bonding methods.

SUMMARY OF THE INVENTION

One object of the present invention, amongst others, is to provide a reinforcing means for rubber articles, particularly tires, which may be bonded to the rubber compound of the article without the need for a special slow curing step and without the need for toxic bonding agents to be incorporated into the rubber article. Another object of the present invention is to provide a simple means for allowing unplated steel to be used as the metal structure of a reinforcing means for rubber articles whilst being able to provide a strong bond between the steel and the rubber compound.

A first aspect of the invention provides a reinforcement means for a rubber article comprising a metal structure having a first layer of silica gel bonded thereto.

A second aspect of the invention provides a method for preparing a reinforcement means for a rubber article comprising:
  i) depositing a silica sol layer onto a metal structure,
  ii) forming a silica gel layer from the silica sol layer,
whereby the reinforcement means is formed.

A third aspect of the invention provides a method for forming a rubber article comprising moulding or co-extruding a reinforcement means according to the first aspect of the invention or prepared by the method of the second aspect of the invention in a rubber compound.

A fourth aspect of the invention provides a rubber article comprising a reinforcement means according to the first aspect of the invention or prepared by the method of the second aspect of the invention bonded in a rubber compound.

DETAILED DESCRIPTION OF THE INVENTION

The features set out below for the various different aspects of the invention may, where applicable, be used with other aspects of the invention, and, when suitable, combinations of the features may be employed as part of the different aspects of the invention, for instance as set out in the claims.

The first aspect of the invention provides a reinforcement means for a rubber article comprising a metal structure having a first layer of silica gel bonded thereto.

The bonding of the first layer of silica gel to the metal structure is typically achieved by means of the process used to deposit the silica gel layer onto the surface of the metal structure. A preferred deposition process involves a sol-gel process which will be described in more detail below. Typically, no additional bonding agent is needed in order to achieve a strong bond between the metal surface and the first layer of silica gel, even when the metal surface is un-plated steel.

Suitably, the rubber article may be a tire. The metal structure is a preferably a steel structure, and may be a metal structure plated with a plating metal or alloy, such as a steel structure plated with a plating metal or alloy, for instance plated with brass.

The metal structure may be a wire, or may comprise a plurality of wires formed into a cable. Preferably, the reinforcement means comprises a plurality of wires, each having a layer of silica gel bonded thereto, and formed into a cable, for instance by plaiting or winding the wires into a cable structure.

The silica gel bonded to the metal structure may be a porous silica gel, for instance a nanoporous silica gel. By "nanoporous silica gel" it is meant that the silica gel has a mean pore diameter from 0.1 to 50 nm, preferably from 1 to 30 nm. Typically, the pore volume of the silica of the first layer will be from 0.1 to 0.8, preferably 0.2 to 0.6 $cm^3/g$. Pore volumes are suitable measured by mercury porosimetry, and the pore diameter may be derived from combination of the pore volume with the surface area as measured, for instance, by the BET method using Nitrogen adsorption.

Without wishing to be bound by theory, it is thought that the rubber compound may be able to flow into the pore voids of the first layer as the rubber article is formed around the reinforcement structure, creating a mechanical bonding which will enhance any chemical bonding between the rubber and the first layer.

Suitably the first layer, which is of silica gel, has a thickness from 20 to 300 nm, preferably from 30 to 200 nm, more preferably from 50 to 150 nm.

The silica gel layer should be coherent, relatively soft and flexible enough to survive handling and processing when the rubber article is formed by bonding rubber compound to the reinforcing means.

By a "silica gel" is meant a compound comprising predominantly silica in its structure, though oxides of other elements may be present in the silica gel, such as alumina, zirconia or titania for instance, provided that these do not prejudice the structural integrity of the silica gel layer. Suitably, the silica gel comprises at least 50% of silica by weight, preferably at least 70%, more preferably at least 90%, expressed as percent by weight of the total elemental oxide in the gel.

Suitably, the reinforcement means may further comprise a second layer, on the first layer, comprising or consisting essentially of an organosilane bonding agent. The organosilane may be suitably selected from the group consisting of aminosilanes, perfluoroalkyl group-containing trichlorosilanes, perfluoroalkyl group-containing trialkoxysilanes, perfluoroalkyl group-containing triacyloxysilanes, perfluoroalkyl group-containing triisocyanatesilanes, alkyl group-containing chlorosilanes, alkyl group-containing alkoxysilanes, alkyl group-containing isoycanatesilanes and mixtures thereof.

More specifically, certain organosilane coupling or bonding agents are used to bond polymeric materials, including rubber compounds, to silica. Such bonding or coupling agents are well-known in the rubber industry and include aminosilanes, vinylsilanes, acrylsilanes, epoxysilanes chlorosilanes and sulphur-containing silanes such as mercaptosilanes. Examples include: aminopropyltriethoxysilane, N-phenyl-r-aminopropyl-trimethoxysilane, vinyltriethoxysilane, acryloxypropyltrimethoxysilane, vinyltrimethoxysilane, 3-glycidoxypropyltriethoxysilane, chloropropyltrimethoxysilane, mercaptoalkyltrialkoxysilane and bis[3-triethoxysilylpropyl]tetrasulphide. Mixtures of such organosilane bonding agents may also be employed.

A preferred coupling or bonding agent is an aminosilane, which may suitably be an N-2(aminoethyl)-3-aminopropylsilane. The silane may be substituted. For instance, the N-2(aminoethyl)-3-aminopropylsilane may be selected from the group consisting of N-2(aminoethyl)-3-aminopropyldimethoxysilane, N-2(aminoethyl)-3-aminopropyltrimethoxysilane, N-2(aminoethyl)-3-aminopropyltriethoxysilane and mixtures thereof.

The second aspect of the invention provides a method for preparing a reinforcement means for a rubber article comprising:

i) depositing a silica sol layer onto a metal structure,
ii) forming a silica gel layer on the metal structure from the silica sol layer,
whereby the reinforcement means is formed.

Typically, step (ii) comprises drying the silica sol layer to form the silica gel layer. Such processes for forming porous, particularly nanoporous silica layers are known as sol-gel processes.

U.S. Pat. No. 6,465,108 discloses a process for the production of articles coated with silica base-coats or layers by means of such a sol-gel process. The silica layers formed by the process detailed in this publication are particularly suitable for present invention in that the silica gel film may be applied and formed in a short period of time without the need for additional steps, such as baking or curing, leading to increases in production costs and time. In this process, a silica sol may be coated on the surface of a substrate by applying on the substrate an alcoholic solution comprising a silicon alkoxide and a volatile acid. It is possible to use colloidal silica or use silicon alkoxide and/or colloidal silica as a source of silica.

Hence, preferably, the silica sol comprises a silicon alkoxide and/or colloidal silica and may include acid or alkali. Preferably, the sol comprises from 0.1 to 20% of silica derived from silicon alkoxide and/or colloidal silica. The pH of sol may be adjusted to a suitable range using acid or alkali. This acid or alkali may function as a catalyst.

The remainder of the sol may suitably be an organic solvent solution comprising alcohol, ketone, or the like, such as with up to 80% water by weight in the solvent solution. An alcoholic water solution such as ethanol/water is particularly suitable.

The sol film is converted to a gel by drying, which may take place typically from ambient temperature, such as 25° C. to 200° C. If necessary silica gel coated material may be further heated at 200 to 600° C. after drying to eliminate organic materials. The silicon alkoxide used in the process is not particularly restricted, and examples of suitable silicon alkoxides include tetramethoxysilane, tetraethoxysilane, tetrapropoxysilane, tetrabutoxysilane and the like. Other suitable silicon alkoxides include methyltrimethoxysilane, dimethyldimethoxysilane, trimethylmethoxysilane, methyltriethoxysilane, dimethyldiethoxysilane, trimethylethoxysilane, ethyltriethoxysilane, diethyldiethoxysilane, and triethylethoxysilane.

As for the acid catalyst used in the above mentioned coating liquid, hydrochloric acid, hydrofluoric acid, nitric acid, acetic acid, formic acid, trifluoroacetic acid and the like are preferably used. Mixtures may be used.

As for the alkali used in the above mentioned coating liquid, ammonia and/or alkali metal hydroxides such as sodium hydroxide, potassium hydroxide, lithium hydroxide and the like are suitable. Mixtures may be used.

The organic solvent used in the sol is not particularly restricted. Suitable alcohols include methanol, ethanol, propan-1-ol, propan-2-ol, butyl alcohol, amyl alcohol and the like. Among them, linear saturated monohydric alcohols having 3 or less carbon atoms such as methanol, ethanol, propan-1-ol, propan-2-ol and the like are preferred as their evaporation rate at ambient temperatures is high.

A film mainly composed of silica having high compactness and having a thickness of 5 to 300 nm may be formed by the process merely by drying at ambient temperature (say 20 to 40° C., for instance 25° C.) or up to 200° C.

When the silica gel layer film is heated at high temperatures, any remaining alkoxyl groups may be lost and replaced by a hydroxyl groups. Hence, preferably, the silica gel layer is not heated to a temperature in excess of 200° C. prior to incorporation into the rubber article to be reinforced.

An oxide of an element other than silicon such as aluminium, zirconium, titanium, caesium and the like may be present in the silica gel at up to 50% by weight, such as up to 30% by weight or up to 20% by weight, expressed as percentage of total weight of elemental oxide in the gel. Such additional oxides may be incorporated in the silica sol in the form of an alkoxide, a colloid or as a metal salt.

Typically, the sol is applied on the surface of the metal structure at ambient temperature and pressure, and naturally dried or forcibly dried at normal pressure or at a temperature up to 200° C. Due to the hydrophilic nature of metal surfaces, the sol will generally wet the surface of the metal structure such that a film is formed.

The method for applying sol is not particularly restricted, and examples thereof include dip coating, flow coating, spin coating, bar coating, roll coating, spray coating, manual application such as brushing and the like. When the metal structure is a wire or cable, dip coating is preferred. The viscosity of the sol may be adjusted in order to give a suitable viscosity for the chosen coating process, such that the sol layer which is applied, when dried to a gel, has the required layer thickness for the first layer. Typically the water content of the latex is from 20 to 90% by weight, but may be even higher if required for a specific coating process.

The method of the second aspect of the invention may comprise the further step (iii) of applying a second layer comprising or consisting essentially of an organosilane bonding agent onto the first layer of silica gel. The organosilane bonding agent is suitably selected from the organosilane bonding or coupling agents mentioned hereinbefore in relation to the first aspect of the invention, and their mixtures.

Without being bound by any theory, it is thought that the organosilane may assist in bonding the silica gel layer to the rubber compound of the rubber article to be reinforced.

The organosilane bonding agent for the second layer may suitably be dissolved in an alcohol solvent with an acid catalyst and the resulting solution is applied onto the first silica gel layer. A de-alcoholisation reaction may then occur between an alkoxy group on the surface of the primer film and a silanol group of the organosilane bonding agent resulting in the first layer bonding to the organosilane bonding agent via siloxane bond without the need for any heat treatment. When the hydrolyzable functional group of the organosilane bonding agent has high reactivity, for example, when the organosilane bonding agent has a chloro group, isocyanate group, acyloxy group and the like, the bond between the primer film and the organosilane bonding agent is formed by a reaction of the group with silanol with an alkoxyl group on the surface of the first layer of silica gel. In this case, the organosilane bonding agent may be applied without dilution or a solution prepared by diluting the organosilane bonding agent with a non-aqueous solvent such as perfluorocarbon, methylene chloride, hydrocarbon, silicone or the like. The method for applying the second layer of organosilane bonding agent is not particularly restricted. Dip-coating is preferred when the metal structure is a wire or cable.

Preferably, the metal structure is a steel structure but may be a plated metal structure such as a steel structure plated with a plating metal or alloy. Preferably, the metal structure is a wire, in which case the method may comprise the further step of forming a plurality of wires having the first silica gel layer, and optional second organosilane bonding agent layer, into a cable.

The third aspect of the invention provides a method for forming a rubber article comprising moulding or co-extruding a reinforcement means according to any one of claims 1 to 11 or prepared by the method of any one of claims 12 to 19 into a rubber compound.

Suitably, the rubber compound, which may be a rubber compound selected from EPDM, BIIR, CR, CSM, HNBR, NBR, SBR, NR and BR rubbers, and mixtures thereof, may further comprise an organosilane bonding agent, preferably mixed into the rubber compound homogeneously. Suitably, the organosilane bonding agent is as detailed hereinbefore as suitable for the second layer of the invention.

Typically, the organosilane bonding agent is selected from the group consisting of perfluoroalkyl group-containing trichlorosilanes, perfluoroalkyl group-containing trialkoxysilanes, perfluoroalkyl group-containing triacyloxysilanes, perfluoroalkyl group-containing triisocyanatesilanes, alkyl group-containing chlorosilanes, alkyl group-containing alkoxysilanes, alkyl group-containing isoycanatesilanes and mixtures thereof. Other suitable bonding or coupling agents are well-known in the rubber industry and include aminosilanes, vinylsilanes, acrylsilanes, epoxysilanes chlorosilanes and sulphur-containing silanes such as mercaptosilanes. Examples include: aminopropyltriethoxysilane, N-phenyl-r-aminopropyl-trimethoxysilane, vinyltriethoxysilane, acryloxypropyltrimethoxysilane, vinyltrimethoxysilane, 3-glycidoxypropyltriethoxysilane, chloropropyl-trimethoxysilane, mercaptoalkyltrialkoxysilane and bis[3-triethoxysilylpropyl]tetrasulphide. Mixtures of such organosilane bonding agents may also be employed.

A preferred coupling or bonding agent is an aminosilane, which may suitably be an N-2(aminoethyl)-3-aminopropylsilane. The silane may be substituted. For instance, the N-2(aminoethyl)-3-aminopropylsilane may be selected from the group consisting of N-2(aminoethyl)-3-aminopropyldimethoxysilane, N-2(aminoethyl)-3-aminopropyltrimethoxysilane, N-2(aminoethyl)-3-aminopropyltriethoxysilane and mixtures thereof.

The organosilane bonding agent is suitably present as typically from 1 phr to 15 phr (i.e. parts per hundred parts of rubber). The organosilane may act as a bonding agent to improve bonding between the rubber compound and the reinforcement means, irrespective of whether the reinforcement means includes a second layer of organosilane bonding agent.

Suitably, the method is used to prepare a rubber article which is a tire.

The fourth aspect of the invention provides a rubber article, preferably a tire, comprising a reinforcement means according to the first aspect of the invention, or prepared by the second aspect of the invention, bonded to a rubber compound. As set out for the third aspect of the invention, the rubber compound may comprise an organic bonding agent as a component, suitably from 1 phr to 15 phr, preferably homogeneously distributed throughout the rubber compound, to assist in bonding the rubber compound to the reinforcement means, irrespective of whether the reinforcement means includes a second layer of organosilane bonding agent.

A specific embodiment of the present invention will now be described in more detail by reference to the following Examples.

EXAMPLES

Steel wires with 60 mm length and 1.5 mm diameter washed using acetone were used as substrates for the coatings applied in the examples.

Example 1

50 parts by weight of tetramethoxysilane, 300 parts by weight of propan-2-ol, 2.5 parts by weight of 1N-nitric acid and 30 parts by weight of purified water were blended and stirred for 2 hours at 50° C., followed by curing the solution for 1 day at 30° C. to obtain a silica sol solution.

The cleaned steel wire was passed through the silica sol solution at a velocity of 30 cm/min to give a coating of silica sol on the surface of the steel wire. The coated wire was then dried for 5 minutes at 100° C., followed by heat-treating for 3 hours at 500° C. This resulted in a steel wire coated by silica gel whose coating thickness was about 250 nm.

Example 2

5 parts by weight of zirconium butoxide was added to 1 part by weight of ethyl acetoacetate and stirred for 2 hours at 30° C. (solution A). Simultaneously, 50 parts by weight of tetraethoxysilane, 1000 parts by weight of propan-2-ol, 2.5 parts by weight of 1N-nitric acid and 50 parts by weight of purified water were blended and stirred for 2 hours at 30° C. (solution B). Then solution A and solution B were blended and mixed by stirring for 3 hours at 50° C., followed by curing for 1 day at 30° C. to obtain a sol solution.

The cleaned steel wire was passed through the silica sol solution at a velocity of 10 cm/min to give a coating of silica sol on the surface of the steel wire. The coated wire was then dried for 10 minutes at ambient temperature (25° C.), followed by heat-treating for 3 hours at 500° C. This resulted in a steel wire coated by silica-zirconia gel whose coating thickness was about 30 nm.

Example 3

25 parts by weight of tetraethoxysilane was added to 380 parts by weight of propan-2-ol, with 1.6 parts by weight of 1N nitric acid, and stirred for 3 hours at 50° C. then stirred for a further 24 h at 30° C.

23 parts by weight of colloidal titania solution whose content was 30% by weight titania with 30-60 nm diameter and 70 wt % of water was added to the above solution with 1 part by weight of trimethylmethoxysilane and stirred for 5 hours at 30° C. This was followed by adding 57.2 parts by weight of ethanol to 10 parts by weight of this solution to yield a sol with 0.5% by weight of solids concentration.

The cleaned steel wire was mounted vertically in an air atmosphere at 20° C. and 30% RH, and coated with the sol solution by pouring the sol solution from the top of the steel wire (flow coating method). The wire with sol coating was then dried for 30 minutes at 150° C., followed by heat-treating for 3 hours at 500° C. This resulted in a steel wire coated by a silica-titania gel coating layer whose thickness was about 100 nm.

Example 4

31 parts by weight of tetraethoxysilane was combined with 380 parts by weight of propan-2-ol, 1.6 parts by weight of 1N nitric acid and 6.5 parts by weight of purified water, and stirred for 5 hours at 50° C. then stirred for 24 hours at 30° C.

30 parts by weight of colloidal silica sol whose content was 20% by weight of silica with 50 nm diameter and 80 wt % of water was added to the above solution, and stirred for 5 hours at 30° C. This was followed by adding 6.6 parts by weight of ethanol to 10 parts by weight of this solution to obtain a sol with 2% by weight of solids concentration.

The sol solution was coated onto the cleaned steel wire by roll coater. The coated wire was subsequently dried for 20 minutes at 120° C., followed by heat-treating for 1 hour at 600° C. This resulted in a steel wire coated by silica gel, the coating having a thickness of about 80 nm.

Example 5

5 parts by weight of zirconium butoxide was added to 1 wt part of ethyl acetoacetate and stirred for 2 hours at 30° C. (solution C). At the same time, 16 parts by weight of tetraethoxysilane, 170 parts by weight of propan-2-ol, 0.8 parts by weight of 1N nitric acid and 3.5 parts by weight of purified water were blended and stirred for 2 hours at 30° C. (solution D). Then solutions C and D were blended with 15 parts by weight of silica colloid sol whose content is 15% by weight of spindle-type silica with 10-20 nm diameter and 40-300 nm length and 85 wt % of water, and stirred for 3 hours at 50° C. then stirred for 24 hours at 30° C. Subsequently, 136 parts by weight of ethanol were added to 11 parts by weight of this solution to obtain a zirconia-silica sol with 0.3 wt % of solid concentration.

The cleaned steel wire was mounted vertically in an air atmosphere at 20° C. and 30% RH, and coated with the sol solution by pouring the sol solution from the top of the steel wire (flow coating method). The wire with its sol coating was then dried for 1 minute at 120° C., followed by heat-treating for 1 hour at 500° C. This resulted in a steel wire coated with a zirconia-silica gel layer whose thickness was about 50 nm.

Example 6

A steel wire (to British Standard BS 1429:1980) was immersed in acetone for 30 minutes, and then immersed in a solution prepared by diluting phosphoric acid with ethanol so that the concentration of phosphoric acid was 1% by weight. A silica sol prepared by diluting HPC7003 (manufactured by JSR Corporation) with isopropyl alcohol so that the concentration of HPC7003 was 5% by weight was applied to the steel wire by the flow coating method. The wire thus coated was then dried for 20 minutes at 200° C. As a result, a steel wire coated with a silica gel layer was obtained.

Next, a solution was prepared by diluting KBM-603 KBM-603 (N-2(aminoethyl)-3-aminopropyltrimethoxysilane, manufactured by Shin-Etsu Chemical Co. Ltd.), an aminosilane coupling agent, with isopropyl alcohol so that the concentration of KBM-603 was 50% by weight. The resulting solution was applied to the steel wire with its silica gel coating by flow coating. The wire thus coated was then dried for 30 minutes at 150° C. As a result, a steel wire coated with a silica gel layer and further with an aminosilane coupling agent layer was obtained.

The adhesion between this steel wire and a rubber matrix having the composition shown in Table 1 was evaluated. The steel wire, subjected to the above treatment, was embedded in the rubber matrix, followed by heating for 25 minutes at 160° C. to bond together coated wire and rubber matrix. Thus, a test sample was obtained. The sample was subjected to a tensile test using a tensile test machine to measure the pull-out strength (adhesive strength) between the steel wire and the rubber. In addition, the fractured surface of the sample was observed visually to determine whether the sample was in a "rubber fracture" state in which the rubber was left on the wire or in an "interfacial debonding" state in which no rubber was left on the wire.

For comparison, a brass wire sample and a non-treated steel wire sample were prepared in the same manner to measure their pull-out strengths (adhesive strengths). Their fractured surfaces also were observed. For the purpose of the tests, the brass wire was used as representative of commercially used brass-plated steel wire.

TABLE 1

| | |
|---|---|
| Natural rubber (SMR 10) | 100 parts by weight |
| Carbon black | 55 parts by weight |
| Stearic acid | 0.5 part by weight |
| Antioxidant (N-phenyl-N'-(1,3-dimethylbutyl)-p-phenylenediamine) | 2 parts by weight |
| ZnO | 8 parts by weight |
| Sulfur | 4 parts by weight |
| Accelerator (for vulcanization) (N,N-dicyclohexylbenzothiazole-2-sulfenamide) | 0.8 part by weight |

| Measurement results | | |
|---|---|---|
| Measured samples | Adhesive strengths (N/50 mm) | Fractured states |
| Steel wire of Example 6 | 269 N | Rubber fracture |
| Brass wire | 190 N | Rubber fracture |
| Non-treated steel wire | 0 N (measurement limit or less) | Interfacial debonding |

It was found that the steel wire of Example 6 had a strong adhesion to rubber, and its adhesive strength to rubber was 1.4 times higher than the brass wire. The adhesive strength of this brass wire to rubber should correspond to that of a conventionally used, brass-plated steel wire because the surface of the brass wire is brass, as for the surface of a brass-plated steel wire. Therefore, it is believed that the use of the steel wire of Example 6 increases the adhesive strength to rubber, compared with the use of brass wire, conventionally used brass-plated steel wire or untreated steel wire.

It will be appreciated that numerous modifications to the above described embodiment may be made without departing from the scope of the invention as defined in the appended claims.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

The invention claimed is:

1. A reinforcement member for a rubber article comprising a steel wire having a first layer of silica gel bonded thereto and a second layer provided directly on the first layer,
   wherein the first layer has a thickness from 50 to 200 nm,
   wherein the first layer is free of alumina,
   wherein the silica gel is a porous silica gel,
   wherein a pore volume of the first layer is from 0.1 to 0.8 cm$^3$/g, and
   wherein the second layer consists essentially of an organosilane bonding agent.

2. A reinforcement member according to claim 1 wherein the steel wire is plated with a plating metal or alloy.

3. A reinforcement member according to claim 1 wherein the reinforcement member comprises a plurality of the steel wires formed into a cable.

4. A reinforcement member according to claim 3 wherein the reinforcement member comprises a plurality of the steel wires, each having a layer of silica gel bonded thereto, and formed into a cable.

5. A reinforcement member according to claim 1 wherein the silica gel is a nanoporous silica gel.

6. A reinforcement member according to claim 1 wherein the organosilane bonding agent is selected from the group consisting of aminosilanes, vinylsilanes, acrylsilanes, epoxysilanes, chlorosilanes, mercaptosilanes and mixtures thereof.

7. A reinforcement member according to claim 6 wherein the aminosilane is an N-2(aminoethyl)-3-aminopropylsilane.

8. A reinforcement member according to claim 7 wherein the N-2(aminoethyl)-3-aminopropylsilane is selected from the group consisting of N-2(aminoethyl)-3-aminopropyldimethoxysilane, N-2(aminoethyl)-3-aminopropyltrimethoxysilane, N-2(aminoethyl)-3-aminopropyltriethoxysilane and mixtures thereof.

9. A reinforcement member according to claim 1, wherein the silica gel comprises at least 50% of silica by weight of the total elemental oxide in the gel.

10. A rubber article comprising a reinforcement member according to claim 1, bonded in a rubber compound.

11. A rubber article according to claim 10 which is a tire.

12. A method for forming a rubber article comprising moulding or co-extruding a reinforcement means according to claim 1 in a rubber compound.

13. A method according to claim 12 wherein the rubber compound comprises the organosilane bonding agent.

14. A method according to claim 13 wherein the organosilane bonding agent is selected from the group consisting of aminosilanes, vinylsilanes, acrylsilanes, epoxysilanes, chlorosilanes, mercaptosilanes and mixtures thereof.

15. A method according to claim 14 wherein the aminosilane is an N-2(aminoethyl)-3-aminopropylsilane.

16. A method according to claim 15 wherein the N-2(aminoethyl)-3-aminopropylsilane is selected from the group consisting of N-2(aminoethyl)-3-aminopropyldimethoxysilane, N-2(aminoethyl)-3-aminopropyltrimethoxysilane, N-2(aminoethyl)-3-aminopropyltriethoxysilane and mixtures thereof.

17. A method according to claim 12 wherein the rubber article is a tire.

18. A method for preparing a reinforcement member for a rubber article comprising:
   i) depositing a silica sol layer onto a steel wire,
   ii) forming a silica gel layer on the steel wire from the silica sol layer, wherein, after (ii),
   no other step is performed to prepare the reinforcement member, or only one of the following (iii) and (iv) is performed to prepare the reinforcement member:
   iii) applying a second layer consisting essentially of an organosilane bonding agent directly onto the first layer of silica gel,
   iv) forming a plurality of the steel wires into a cable,
   wherein the silica gel layer has a thickness from 50 to 200 nm,
   wherein the silica gel layer is free of alumina,
   wherein the silica gel layer is a porous silica gel layer, and
   wherein a pore volume of the silica gel layer is from 0.1 to 0.8 cm$^3$/g.

19. A method according to claim 18 wherein step (ii) comprises drying the silica sol layer to form the silica gel layer.

20. A method according to claim 18 wherein the silica sol comprises an alcoholic solution comprising a silicon alkoxide and a volatile acid.

21. A method according to claim 20 wherein the silicon alkoxide is a tetraalkoxysilane.

22. A method according to claim 18 wherein the organosilane bonding agent is selected from the group consisting of aminosilanes, vinylsilanes, acrylsilanes, epoxysilanes, chlorosilanes, mercaptosilanes and mixtures thereof.

23. A method according to claim 22 wherein the aminosilane is an N-2(aminoethyl)-3-aminopropylsilane.

24. A method according to claim 23 wherein the N-2(aminoethyl)-3-aminopropylsilane is selected from the group consisting of N-2(aminoethyl)-3-aminopropyldimethoxysilane, N-2(aminoethyl)-3-aminopropyltrimethoxysilane, N-2(aminoethyl)-3-aminopropyltriethoxysilane and mixtures thereof.

25. A method according to claim 18 wherein the steel wire is plated with a plating metal or alloy.

26. A method for forming a rubber article comprising moulding or co-extruding a reinforcement means according to prepared by the method of claim 18 in a rubber compound.

27. A method according to claim 26 wherein the rubber compound comprises the organosilane bonding agent.

28. A method according to claim 27 wherein the organosilane bonding agent is selected from the group consisting of aminosilanes, vinylsilanes, acrylsilanes, epoxysilanes, chlorosilanes, mercaptosilanes and mixtures thereof.

29. A method according to claim 28 wherein the aminosilane is an N-2(aminoethyl)-3-aminopropylsilane.

30. A method according to claim 29 wherein the N-2(aminoethyl)-3-aminopropylsilane is selected from the group consisting of N-2(aminoethyl)-3-aminopropyldimethoxysilane, N-2(aminoethyl)-3-aminopropyltrimethoxysilane, N-2(aminoethyl)-3-aminopropyltriethoxysilane and mixtures thereof.

31. A method according to claim 26 wherein the rubber article is a tire.

32. A rubber article comprising a reinforcement member prepared by the method of claim 18, bonded in a rubber compound.

33. A rubber article according to claim 32 which is a tire.

* * * * *

UNITED STATES PATENT AND TRADEMARK OFFICE
CERTIFICATE OF CORRECTION

PATENT NO. : 10,308,071 B2
APPLICATION NO. : 13/392045
DATED : June 4, 2019
INVENTOR(S) : Inoue et al.

It is certified that error appears in the above-identified patent and that said Letters Patent is hereby corrected as shown below:

On the Title Page

Item (75), Column 1, in "Inventors", Line 1, delete "W" and insert -- W. --.

Page 2, Item (56), Column 1, under "Other Publications", Line 1, delete "Rajeshkumar," and insert -- Rajesh Kumar, --.

In the Specification

Column 1, Line 11, after "cycle" delete "," and insert -- . --.

Column 2, Line 2, after "nevertheless" insert -- , --.

Column 2, Line 34, after "Also" insert -- , --.

Column 4, Line 42, delete "isoycanatesilanes" and insert -- isocyanatesilanes --.

Column 7, Line 21, delete "isoycanatesilanes" and insert -- isocyanatesilanes --.

Column 9, Lines 18-19, delete "1 wt" and insert -- 1 part by weight --.

Column 9, Lines 54-55, delete "KBM-603 KBM-603" and insert -- KBM-603 --.

In the Claims

Column 11, in Claim 13, Line 52, delete "the" and insert -- an --.

Column 11, in Claim 14, Line 54, after "agent" insert -- in the rubber compound --.

Signed and Sealed this
Eighth Day of October, 2019

Andrei Iancu
*Director of the United States Patent and Trademark Office*

Column 12, in Claim 27, Line 47, delete "the" and insert -- an --.

Column 12, in Claim 28, Line 49, after "agent" insert -- in the rubber compound --.